March 11, 1947.  A. F. ALEXANDER  2,417,047
VARIABLE SPEED BELT DRIVE
Filed Oct. 25, 1945
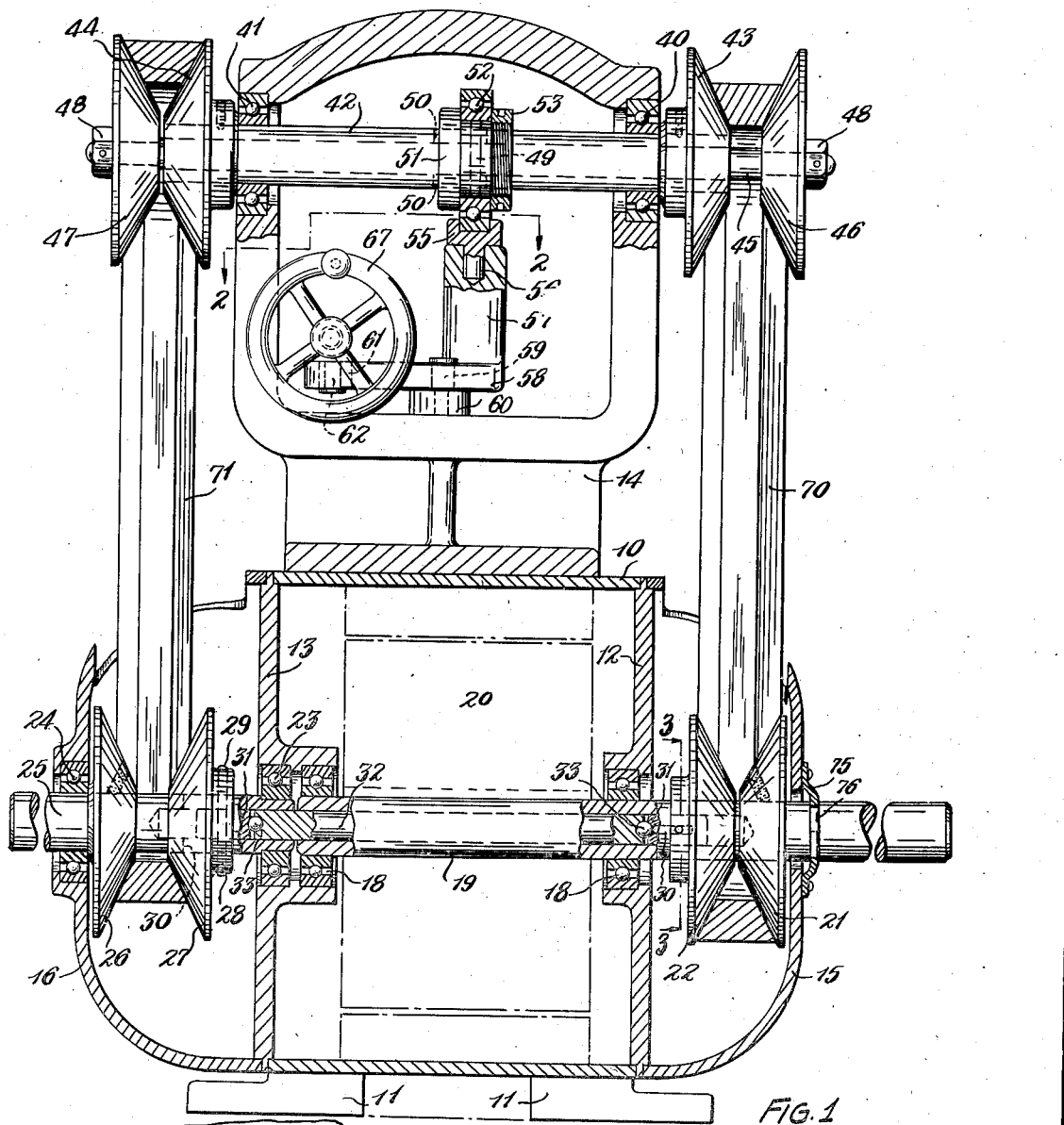
FIG. 1
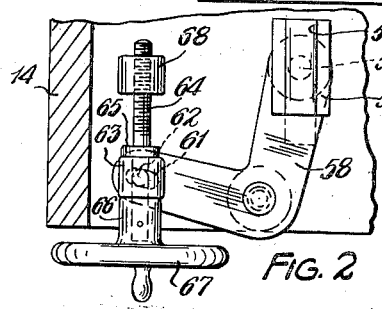
FIG. 2
FIG. 3
INVENTOR.
ARTHUR F. ALEXANDER
BY
Kwis Hudson Baughton & Williams
ATTORNEYS Patented Mar. 11, 1947

2,417,047

UNITED STATES PATENT OFFICE 2,417,047

VARIABLE-SPEED BELT DRIVE

Arthur F. Alexander, Cleveland, Ohio

Application October 25, 1945, Serial No. 624,381

9 Claims. (Cl. 74—230.17)

This invention relates to improvements in power units, and has to do with the provision of a unitary machine embodying an electric motor and capable of delivering power at an infinite number of speeds.

One of the objects of the invention is the provision of a compact, nicely balanced unit more or less symmetrical in shape and appearance.

Another object is the provision of a standard power unit adapted to deliver power at a multiplicity of speeds and suited for application and mounting in the place of the conventional single speed electric motor.

Still another object is the provision of a unit of the character stated embodying simple and readily adjusted change speed means, capable of actuation during operation of the unit.

Other objects and features of novelty will appear as I proceed with the description of that embodiment of the invention which, for the purposes of the present application, I have illustrated in the accompanying drawing, in which Fig. 1 is a front elevational view, partly in vertical section, of a unit embodying the invention.

Fig. 2 is a detail plan view taken substantially on the line 2—2 of Fig. 1, and

Fig. 3 is a detail sectional view taken substantially on the line 3—3 of Fig. 1.

In the drawings there is shown a housing comprising a cylindrical member 10 mounted on feet 11, vertical side plates 12 and 13 and a bracket 14 mounted on the cylindrical member 10. The housing may comprise also dished end members 15 and 16. Preferably the upper part of the structure is enclosed in a sheet-metal hood which, however, is not an essential part of the unit and is omitted from the illustration herein in the interest of simplification.

In the wall plates 12 and 13 there are mounted aligned antifriction bearings 17 and 18, in which is journaled a shaft 19 that is hollow or tubular for at least a portion of its length. On this hollow shaft is keyed the rotor 20 of an electric motor shown in outline only in the drawing. On this hollow shaft outside the wall plate 12 there is a split V pulley comprising the element 21 which is secured to the shaft and the element 22 which is free to move axially of the shaft but turns with the shaft.

Another antifriction bearing 23 in wall plate 13 and a bearing 24 in frame member 16 are mounted in alignment with bearings 17 and 18 and support a shaft 25, hereinafter referred to as the output shaft, which is also hollow for a portion of its length. On this shaft there is a split V pulley, one element 26 of which is fixed upon the shaft and the other element 27 of which is slidable lengthwise on the shaft.

Pulley elements 22 and 27 are substantially identical although reversed in position, and each has a projecting hub 28 in which is mounted a diametrically disposed pin 29 that extends through longitudinal slots 30 in the hollow shaft 19. Each of these pins also extends through a diametrical hole in a hardened cylindrical block 31, the pin for element 22 being slidable within hollow shaft 19 and that for element 27 being slidable in the hollow part of shaft 25. Between the two blocks 31 there is a rod or shaft 32 for transmitting longitudinal movement from element 22 to element 27 or vice versa, and because these elements rotate at different speeds balls 33 or other suitable antifriction bearings may be employed between the shaft 32 and each of the blocks 31. It is also within the purview of the invention to omit the right hand block 31 and its associated ball 33, in which event the corresponding pin 29 would extend through the shaft 32, and that shaft would necessarily rotate at the speed of hollow shaft 19.

In the bracket 14 there are two antifriction bearings 40 and 41, in which there is journaled a sleeve 42 which projects far enough beyond those bearings to receive the inner elements 43 and 44 of two split V pulleys. These pulley elements are secured to the sleeve as shown in the drawing and have hub portions engaging the inner races of bearings 40 and 41, whereby the sleeve and the pulley elements mounted thereon are held against axial movement. A stem 45 of greater length than the sleeve is mounted to slide therein. Its projecting ends are reduced in diameter and receive the remaining elements 46 and 47 of the split V pulleys carried by this counter-shaft assembly. The elements 46 and 47 may be fixed upon the stem by means of nuts 48 threaded onto the reduced ends thereof.

Suitable means are provided for moving stem 45 endwise for the purpose of expanding the split V pulley at one end of the assembly while contracting that at the opposite end. Preferably this means comprises a pin 49 mounted in a diametrical hole in the stem, projecting through slots 50 in sleeve 42 and extending into holes in a flanged collar 51 which surrounds and is slidable upon the sleeve 42. This arrangement insures the rotation of the sleeve and stem together while permitting relative longitudinal movement. A ball bearing 52 surrounds collar 51, and its inner race is clamped against the flange of the collar by means of a ring nut 53 threaded upon the collar. The outer race of this ball bearing extends into a groove 54 in the top of a block 55 which has a downwardly extending pivot 56 that turns in a socket in an upwardly directed extension 57 of a bell crank lever 58 pivoted at 59 to a boss 60 forming part of bracket 14. The other end of bell crank lever 58 has a slot 61 therein which receives a pin 62 depending from a collar 63 that surrounds a rod 64 between a shoulder 65 on the rod and the hub 66 of a hand wheel 67 pinned to the rod 64. The rod has a threaded portion, as shown in Fig. 2, which projects through an internally threaded ear 68 on bracket 14. By this means obviously the ball bearing 52 and collar 51 may be moved on the sleeve 42 longitudinally thereof, thereby shifting the outer elements of the two split V pulleys.

A V-belt 70 connects the motor shaft pulley with the right hand pulley of the countershaft and a V-belt 71 connects the left hand pulley of the countershaft with the pulley of the output shaft. Shaft 19 projects beyond the housing member 15 and may be used to drive any machine or piece of apparatus which is suitable for operation at constant speed. Shaft 25 extends beyond the housing member 16, and from it may be taken driving power at a wide variation of speeds either below or above motor speed, or at motor speed, as will be evident to those skilled in the art.

When the stem 45 is adjusted to the position shown in the drawing the speed of the output shaft 25 is substantially maximum, or of the order of double motor speed. As the operator turns hand wheel 67 to move stem 45 toward the left the pulley element 46 is drawn toward the pulley element 43, causing the belt 70 to run upon a larger diameter part of the split pulley 43, 46. At the same time the pulley element 47 moves away from the element 44 permitting the belt 71 to run upon a smaller diameter part of the split pulley. As the belt 70 rides outwardly upon the pulley 43, 46 it exerts wedging pressure tending to separate pulley elements 21 and 22, and inasmuch as element 21 is fixed on its shaft, element 22 is caused to move toward the left. In this operation both bights of belt 70 move to the left the same amount, and proper alignment is preserved.

The movement of pulley element 22 toward the left transmits movement through the blocks 31 and the shaft 32 to the pulley element 27, thereby narrowing the space between the elements of the output pulley and causing the belt 71 to ride or travel outwardly upon the pulley and at the same time to shift toward the left. The expansion of the pulley 44, 47 due to movement of stem 45 permits the upper bight of the belt to run upon a smaller diameter part of that pulley in response to belt pressure resulting from the contraction of pulley 26, 27 and also permits the upper bight of the belt to move to the left an amount corresponding with the movement of the lower bight.

The maintenance of the belts throughout the different speed adjustments so that they always run in planes perpendicular to the shafts results from maintaining the right hand pulley element fixed on one shaft and the left hand element fixed on the other shaft. In the case of the countershaft the two inside elements are fixed against movement longitudinally in a manner previously described, and in the case of the lower shafts 19 and 25 the outside elements are fixed. As to the latter shafts this may be accomplished in various ways, but for purposes of illustration movement of shaft 25 to which element 26 is fastened is prevented by contact of the hub part of element 26 with the inner race of bearing 24 and by setting the inner race of bearing 23 into a shouldered recess in the shaft. Shaft 19, to which pulley element 21 is secured, is shown held against longitudinal movement by means of a split ring 75 secured to the housing and engaging in an annular groove 76 in the shaft.

Having thus described my invention, I claim:

1. In a power unit, a housing, aligned motor and output shafts, a rotor on said motor shaft, a split V pulley on said motor shaft at one side of said rotor, a split V pulley on said output shaft at the other side of said rotor, a countershaft mounted on said housing carrying split V pulleys in radial alignment with said motor and output shaft pulleys respectively, and means for expanding one of said countershaft pulleys while contracting the other.

2. A power unit according to claim 1, wherein the said motor shaft is hollow and one element of its split pulley is connected through said hollow shaft with one element of the output shaft pulley for communicating movement from one of said elements to the other.

3. A power unit according to claim 1, wherein the said motor shaft is hollow, and comprising connecting means including a rod extending through said hollow shaft for transmitting movement from the inside element of one pulley to the inside element of the other pulley while permitting relative rotation.

4. A power unit according to claim 1, wherein said countershaft comprises a sleeve member at the ends of which the inside elements of the two countershaft pulleys are fixed, a stem member extending through said sleeve member and carrying at its extremities the remaining elements of said pulleys, and adjusting means disposed between said pulleys for moving one of said members endwise.

5. A power unit according to claim 1, wherein said countershaft comprises a sleeve at the ends of which the inside elements of the two countershaft pulleys are fixed and a stem extending through said sleeve and carrying at its extremities the outermost elements of said pulleys, and adjusting means operative through a slot in said sleeve for moving said stem endwise.

6. In a power unit, a housing, a hollow motor shaft and a hollow output shaft, aligned bearings for each of said shafts, a rotor on said motor shaft, a split V pulley on said motor shaft at one side of said rotor, a split V pulley on said output shaft at the other side of said rotor, a countershaft mounted on said housing carrying split V pulleys in radial alignment respectively with said motor and output shaft pulleys, means for expanding one countershaft pulley while contracting the other, and means comprising a rod mounted in said hollow shafts for transmitting movement longitudinally thereof from an element of the pulley on one hollow shaft to an element of the pulley on the other hollow shaft while permitting relative rotation of said pulleys.

7. A power unit according to claim 1, wherein said countershaft comprises a sleeve, a pair of bearings in which said sleeve is journaled, the inside elements of the two countershaft pulleys being fixed upon the ends of said sleeve adjacent the outer sides of said bearings, a stem extending through said sleeve and carrying at its extremities the outer elements of said pulleys, and adjusting means for moving said stem endwise.

8. A power unit according to claim 1, wherein said countershaft comprises a sleeve, a pair of bearings in which said sleeve is journaled, the inside elements of the two countershaft pulleys being fixed upon the ends of said sleeve adjacent the outer sides of said bearings, a stem extending through said sleeve and carrying at its extremities the outer elements of said pulleys, and adjusting means for moving said stem endwise comprising a pin fixed in said stem between said pulleys and projecting through slots in said sleeve.

9. In a power unit, a housing, a motor shaft and an output shaft in alignment, a rotor on said motor shaft, a split V pulley on said motor shaft at one side of said rotor, a split V pulley on said output shaft at the other side of said rotor, a countershaft mounted on said housing carrying split V pulleys in radial alignment with said motor and output shaft pulleys respectively, said countershaft comprising a sleeve held against endwise movement, the inner elements of the countershaft pulleys being mounted on said sleeve, said countershaft comprising also a stem extending through said sleeve and longitudinally movable therein, the outer elements of the countershaft pulleys being mounted upon said stem, said motor shaft and said output shaft being held against longitudinal movement, and the outer pulley elements on said last named shafts being fixed thereupon while the inner pulley elements are free to move endwise of the shafts.

ARTHUR F. ALEXANDER.

REFERENCES CITED

The following references are of record in the file of this patent:

UNITED STATES PATENTS

| Number | Name | Date |
|---|---|---|
| 2,179,053 | Reeves | Nov. 7, 1939 |
| 2,351,148 | Rafter | June 13, 1944 |